United States Patent [19]

Borovicka, Sr. et al.

[11] 4,444,941
[45] Apr. 24, 1984

[54] LOW TEMPERATURE CURE LATEXES

[75] Inventors: David A. Borovicka, Sr., Parma; Kenneth G. Hahn, Jr., Hinckley; John T. Tupa, Broadview Heights, all of Ohio

[73] Assignee: SCM Corporation, New York, N.Y.

[21] Appl. No.: 413,728

[22] Filed: Sep. 1, 1982

Related U.S. Application Data

[63] Continuation-in-part of Ser. No. 264,419, May 18, 1981, abandoned.

[51] Int. Cl.³ .............................................. C08L 75/00
[52] U.S. Cl. .................................. 524/507; 525/123; 525/375; 526/304; 526/311
[58] Field of Search ................. 524/507; 526/304, 311; 525/375, 123

[56] References Cited

U.S. PATENT DOCUMENTS

| | | | |
|---|---|---|---|
| 3,748,295 | 7/1973 | Mikofalvy et al. | 524/807 |
| 3,758,324 | 9/1973 | Barrett | 106/146 |
| 4,064,191 | 12/1977 | Parekh | 260/850 |
| 4,105,708 | 8/1978 | Parekh | 260/849 |
| 4,178,319 | 12/1979 | Chatta | 525/188 |

FOREIGN PATENT DOCUMENTS 1562971 3/1980 United Kingdom.

*Primary Examiner*—Joseph L. Schofer
*Assistant Examiner*—Bernard Lipman
*Attorney, Agent, or Firm*—Thomas M. Schmitz

[57] ABSTRACT

Thermosetting low temperature cure coating compositions produced by combining certain acrylamide emulsion polymers containing both carboxyl and hydroxyl groups with a glycoluril whereby both the carboxyl and hydroxyl groups cross-link with the glycoluril upon curing.

11 Claims, No Drawings

LOW TEMPERATURE CURE LATEXES

BACKGROUND OF THE INVENTION

This application is a continuation-in-part of copending application Ser. No. 264,419 filed May 18, 1981, now abandoned, and the same is incorporated herein by reference.

This invention relates to thermosetting emulsion latex mixture and more particularly to an acylamide modified emulsion polymer containing both hydroxyl and carboxyl groups adapted to be coreactive with a gycoluril to form a thermoset crosslinked polymer upon moderate heating.

Glycoluril compositions are known for use in solvent based coating compositions such as disclosed in U.S. Pat. No. 4,064,191 and for use in powder coatings such as disclosed in U.S. Pat. No. 4,118,437.

It now has been found that an aqueous latex coating composition based on a thermosetting combination of glycoluril adapted to cross-link an acrylamide polymer containing reactive carboxyl and hydroxyl groups provides a low temperature cure surface coating. Low temperature water based coatings are highly desirable since less energy is required for curing and organic solvent emission pollution is avoided. The specific reactive acrylamide polymer of this invention will cure with coreactiveglycoluril at surprising low temperatures of about 40° C. to 120° C. for 0.1 to 20 minutes, and advantageously less than 3 minutes. This quick and low temperature cure cannot be achieved with similar polymers now with conventional cross-linking compounds such as melamine. These and other advantages of this invention will become more apparent from the detailed description of the invention.

SUMMARY OF THE INVENTION

Briefly, an acrylamide emulsion polymer containing at least about 1.5% of copolymerized N-alkylol amide as well as carboxyl containing monomer and hydroxyl containing monomer to provide at least about 8% by weight monomers copolymerized with other ethylenic monomers to provide a reactive emulsion polymer adapted to be cross-linked with a glycoluril upon moderate heat curing to form a cured coating composition. The acrylamide monomer, the carboxyl monomer, and the hydroxyl monomer are copolymerized together with other ethylenically unsaturated monomers in an aqueous emulsion polymerization process to produce a reactive emulsion polymer. Glycoluril is added to the emulsion to provide a thermosetting emulsion mixture adapted to cure and cross-link upon application of moderate heat.

DETAILED DESCRIPTION OF THE INVENTION

The thermosetting composition of this invention comprises an acrylamide emulsion polymer containing both reactive carboxyl and hydroxyl groups adapted to be coreactive and cross-link with a glycoluril.

Referring first to the emulsion matrix polymer, the acrylamide polymer comprises copolymerized ethylenically unsaturated monomers including at least 10% copolymerized monomers of acrylamide, carboxyl monomer, and hydroxyl monomer. Preferably the polymer contains polymerized monomer by weight between 1% and 20% acrylamide, between 0.5% and 10% carboxyl monomer, and between 2% and 20% hydroxyl monomer, with the balance being other ethylenic monomers. The acrylamide monomers can be acrylamide, methacrylamide, ethyacrylamide, acrylonitrile, methacrylonitrile, and similar atoms alkyl acrylamide and methacrylamide monomers; provided that a minor amount of N-alkanol amide monomers is included to provide a polymer containing at least 1.5% by weight of copolymerized N-alkanol amide monomer for example, N-methylol acrylamide, N-ethanol acrylamide, N-propanol acrylamide, N-methylol methacrylamide, N-ethanol methacrylamide, and similar acrylamides and methacrylamide. Carboxyl containing monomers are ethylenically unsaturated monomers containing carboxyl groups such as acrylic, methacrylic, or ethacrylic acid, as well as itaconic, citriconic, fumaric, maleic, mesaconic and aconitic acids. The preferred acids are acrylic and methacrylic acids. Hydroxyl containing monomers ethylenically unsatuated monomers containing a hydroxyl and can include for example hydroxy alkyl acrylates or methacrylates such as hydroxyethyl, hydroxypropyl, hydroxybutyl, hydroxyhexyl, hydroxyoctyl and similar lower alkyl hydroxy acrylates and methacrylates. Other ethylenically unsaturated monomers other than acrylamide, carboxyl, and hydroxyl monomers can include vinyl unsaturated monomers containing vinyl double bond unsaturation including, for example, vinyl esters such a vinyl acetate, vinyl proprionate, vinyl butyrates, vinyl benzoate, isopropenyl acetate and like vinyl esters; vinyl amides, such as acrylamide; and methacrylamide; and vinyl halides such as vinyl chloride. Ethylenically unsaturated monomers other than vinyl unsaturated monomers can include, for example, styrene, methyl styrenes and similar alkyl styrenes, chlorostyrene, vinyl toluene, vinyl naphtalene, divinyl benzene, diallyl phthalate and similar diallyl derivatives, butadiene, alkyl esters of acrylic and methacrylic acid and similar ethylenically unsaturated monomers. Acrylic unsaturated monomers include lower alkyl esters of acrylic or methacrylic acid having an alkyl ester portion containing between 1 to 12 carbon atoms as well as aromatic derivatives of acrylic and methacrylic acid, and can include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids. The ethylenically unsaturated monomers can be co-polymerized by free radical induced addition polymerization using peroxy or azo catalysts, common redox catalysts, ultraviolet radiation, or the like.

The acrylamide polymer containing reactive hydroxyl and carboxyl groups is adapted to be cross-linked by reaction with a glycoluril derivative. Glycoluril derivatives are disclosed in U.S. Pat. No. 4,064,191 and are also known as acetylendiureas. Glycolurils are derived by reacting two moles of urea with one mole of glyoxal to provide a complex ring structure illustrated as follows:

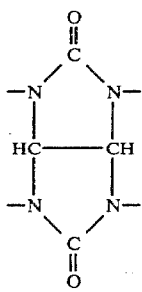

Wherein the substitues constituents can be a hydrogen, or a lower alkyl radical, or can be methylolated partially or fully by reacting with 1 to 4 moles of formaldehyde to provide a methylol glycoluril. The preparation of various glycolurils are illustrated in U.S. Pat. No. 4,064,191 such as tetramethylol glycoluril, tetrabutoxymethyl glycoluril, partially methyolated glycoluril, tetramethoxymethyl glycoluril, and dimethoxydiethoxy glycoluril. Useful glycoluril derivatives include for example, mono- and dimethylether of dimethylol glycoluril, the trimethylether of tetramethylol glycoluril, the tetramethylether of tetramethylol glycoluril, tetrakisethoxymethyl glycoluril, tetrakisopropoxmethyl glycoluril, tetrakisbutoxymethyl glycoluril, tetrakisamyloxymethyl glycoluril, tetrakishexoxymethyl glycoluril and the like.

The ethylenic monomers can be polymerized in an aqueous medium at a pH below 2 although preferably between about 1.0 and 6. Generally, the polymerization is conducted at a temperature of about 20–100° C. in the presence of a free radical generating catalyst. Commonly used free radical initiators include various peroxygen compounds such as the persulfates, benzoyl peroxide, t-butyl hydroperoxide, cumene hydroperoxide, t-butyl diperphthalate, pelargonyl peroxide and l-hydroxycyclohexyl hydroperoxide; azo compounds such as azodiisobutyronitrile and dimethylazodiisobutyrate; and the like. Particularly preferred as polmerization initiators are the water-soluble peroxygen compounds such as hydrogen peroxide and the sodium, potassium and ammonium persulfates used by themselves or in activated "redox" type systems. Typical "redox" systems include alkali metal persulfates with: A reducing substance such as a polyhydroxy phenol and oxidizable sulfur compound such as sodium sulfite or sodium bisulfite, a reducing sugar, dimethylamino propionitrile, a diazomercapto compound and a ferricyanide compound, and the like. The amount of initiator used will generally be in the range between about 0.1 to 3% by weight based on the monomers and preferably is maintained between 0.15 and 0.8% by weight. Usually the initiator will all be charged at the outset of the polymerization, however, incremental addition or proportioning of the initiator is often employed.

When an emulsifier is used to prepare the latices of this invention, they are the general types of anionic and non-ionic emulsifiers. Exemplary anionic emulsifiers which may be employed are: alkali metal or ammonium salts of the sulfates of alcohols having from 8 to 18 carbon atoms, such as sodium lauryl sulfate; ethanolamine lauryl sulfate, ethylamine lauryl sulfate; alkali metal and ammonium salts of sulfonated petroleum or paraffin oils; sodium salts of aromatic sulfonic acides, such as dodecane-1-sulfonic acid and octadiene-1-sulfonic acid; aralkylsulfonates such as sodium ispropyl benzene sulfonate, sodium dodecyl benzene sulfonate and sodium isobutyl naphthalene sulfonate; alkali metal and ammonium salts of sulfonated dicarboxylic acid esters such as sodium dioctyl sulfosuccinate, disodium N-octadecylsulfosuccinamate; alkali metal or ammonium salts of free acids of complex organic mono- and diphosphate esters and the like. So-called non-ionic emulsifiers such as octyl- or nonylphenyl polyethoxyethanol and the like may also be used.

The amount of emulsifier used may be from about 0.01 to 6% or more by weight of the monomers. All the emulsifier may be added at the beginning of the polymerization or it may be added incrementally or by proportioning throughout the run.

Typical polymerizations for the preparation of the self-emulsion latices of this invention are conducted by charging the monomers into the polymerization reactor which contains water and a portion of the emulsifying agent. The reactor and its contents are heated and the initiator added.

The preferred emulsion latex matrix polymer can contain by weight between 1% and 20% acrylamide or methacrylamide provided that at least 1.0% is N-methylol acrylamide, and between 0.5% to 10% carboxylic acid monomer, and from 2% to 20% alkylhydroxy monomer is copolymerized, with the balance being other ethylenically unsaturated monomer. The thermosetting composition of this invention can contain between 5% and 55% weight glycoluril with the remaining being reactive matrix polymer. The preferred compositions contain between 15 and 35 weight parts per 100 weight parts reactive matrix polymer.

The thermosetting composition cure quickly at low temperatures under either basic or acidic curing conditions although a faster cure results under acidic conditions. Acid catalyst such a p-toluene sulfonic acid is useful for accelerating the cure. The thermosetting composition can be used as a clear coating or as a pigmented coating.

The merits of this invention are further illustrated in the following examples.

EXAMPLE 1

(a) Latex. An emulsion polymer was produced from the following components:
 deionized water: 85.6 grams
 sodium dihexyl sulfosuccinate: 0.5 grams
 potassium carbonate: 0.136 grams
 ammonium persulfate: 0.273 grams
 sodium bis-tridecyl suffosuccinate: 0.319 grams
 butyl acrylate: 39.0 grams
 methyl methacrylate: 39.0 grams
 N-isobutoxymethyl acrylamide: 12.0 grams
 2-hydroxyethyl acrylate: 6.0 grams
 glacial methacrylic acid: 4.0 grams
 sodium formaldehyde sulfoxilate: 0.180 grams
 tertiary butyl hydroperoxide: 0.012 grams The emulsion polymer is prepared as follows. The monomers are polymerized in a conventional reactor using a standard procedure of metering in the main body of monomer into the heated water plus surfactant and potassium carbonate over a 2–5 hour intervals. Batch loading of monomer is possible but not preferred. Changing the monomer composition during the feed is also possible and may lead to faster cure and/or cleaner batches. The reaction is run at 60°–86° C. The sodium formaldehyde sulfoxilate and t-butyl hydroperoxide are added after the main body of monomers have been polymerized in order that traces of free monomer are reacted. The emulsion polymer latex is particularly suitable as a binder system for a paint composition.

(b) Paint composition. The foregoing latex (a) can be utilized to produce a useful paint composition which can be applied to a substrate and cured at low temperatures such as 10 minutes at 120° F., or an oven bake and/or infrared heat to achieve a substrate surface temperature of from about 100° F. to about 260° F. A typical paint composition is as follows.

| PAINT COMPOSITION | |
|---|---|
| | Pounds |
| Glycoluril (45% water) | 121.36 |
| Alkyl-aryl polyethoxy ethanol | 5.25 |
| Organic phosphate ester | 5.25 |
| Water | 19.37 |
| Silicon defoamer | 2.10 |
| Titanium dioxide | 123.36 |
| Amorphous silica | 319.13 |
| Fine particle silica | 14.53 |
| Latex (a) | 436.72 |
| Non-silicone defoamer | 5.25 |
| Isopropanol | 101.83 |
| p-toluene sulfonic acid (60% isopropanol) | 21.8 |

The p-toluene sulfonic acid was added prior to use and the paint film was cured for 10 minutes at 120° F. to provide an excellent cured paint film.

The advantages of this invention include the lower temperature (by 30 to 150° F.) required for good cure in the bake cycle compared to coatings of similar composition but not containing the hydroxyl monomer and cross-linking agent.

EXAMPLE 2

Similar to Example 1, an emulsion polymer was produced from the following components.

| | 549-7-B |
|---|---|
| Demineralized Water | 88.711 |
| Monawet MM-80 | 0.500 |
| Butyl Acrylate | 39.100 |
| Methyl Methacrylate | 49.000 |
| Hydroxyethyl Acrylate | 6.000 |
| Methacrylic Acid | 4.000 |
| N-Methylol Acrylamide | 3.958 |
| Monawet MT-70 | 0.319 |
| Hydrosulfite AWC-Rice | 0.018 |
| t-Butyl Hydroperoxide | 0.012 |
| Nuosept 95 | 0.042 |
| Ammonium Persulfate | 0.273 |
| | 191.833 |

EXAMPLE 3

Similar to Example 1, a clear unpigmented coating was produced from the following components.

| | Pounds |
|---|---|
| Glycouril (45% water) | 121.36 |
| Non-Silicone Defoamer | 5.25 |
| Latex | 436.72 |
| Isopropanol | 25.0 |
| p-Toluene Sulfonic Acid (60% Isopropanol | 2.18 |

The foregoing examples are not intended to be limiting except by the appended claims.

We claim:

1. A stabilized aqueous thermosetting low temperature curable composition containing a polymeric composition dispersed in water, comprising on a weight basis:
between 5% and 55% of methylolated glycoluril containing between 1 and 4 groups of methylol, and between 45% and 95% emulsion polymer wherein said emulsion polymer comprises polymerized ethylenically unsaturated monomers selected from between 0.5% and 10% carboxylic acid monomer, between 1% and 20% acrylamide or methacrylamide monomer, between 2% and 20% alkylhydroxy monomer, and the balance being other ethylenically unsaturated monomer, whereby said emulsion polymer contains reactive carboxyl and hydroxyl groups for crosslinking by reaction with said glycoluril.

2. A stabilized aqueous thermosetting low temperature curable composition containing a polymeric composition dispersed in water, comprising on a weight basis:
between 5 and 35 parts of methylolated glycoluril containing between 1 and 4 groups of methylol per 100 parts of emulsion polymer, wherein said emulsion polymer comprises polymerized ethylenically unsaturated monomers selected from between 0.5% and 10% carboxylic acid monomer, between 1% and 20% acrylamide or methacrylamide monomer, between 2% and 20% alkylhydroxy monomer, and the balance being other ethylenically unsaturated monomer, whereby said emulsion polymer contains reactive carboxyl and hydroxyl groups for cross-linking by reaction with said glycoluril.

3. The composition in claim 2 wherein the polymerized monomers include at least 1.5% by weight of an N-alkanol amide monomer.

4. The composition in claim 2 wherein the composition contains a curing catalyst of p-toluene sulfonic acid.

5. The composition in claim 2 wherein the composition comprises a clear unpigmented paint coating.

6. The composition in claim 2 wherein the composition comprises a pigmented paint coating.

7. The composition in claim 1 wherein the polymerized monomers include at least 1.5% by weight N-alkanol amide monomer.

8. In a process for producing a thermosetting low temperature curable composition containing a polymeric composition dispersed in water, the process steps comprising:
providing a polymer mixture containing by weight between 5% and 55% of methylol glycoluril containing between 1 and 4 methylol groups, and between 45% and 95% of an emulsion polymer comprising polymerized ethylenically unsaturated monomers containing on a weight basis between 0.5% and 10% carboxylic acid monomer, between 1% and 20% acrylamide or methacrylamide monomer, between 2% and 20% alkylhydroxy monomer, and the balance being other ethylenically unsaturated monomers, whereby said emulsion polymer contains reactive carboxyl and hydroxyl groups for cross-linking by reaction with said glycoluril.

9. In a process for producing a thermosetting low temperature curable composition containing a polymeric composition dispersed in water, the process steps comprising:

providing a polymer mixture of between 15 and 35 weight parts of methylol glycoluril containing between 1 and 4 methylol groups, and 100 weight parts of an emulsion polymer comprising polymerized ethylenically unsaturated monomers on a weight basis of between 0.5% and 10% carboxylic acid monomer, between 1% and 20% acrylamide or methacrylamide monomer, between 2% and 20% alkylhydroxy monomer, and the balance being other ethylenically unsaturated monomer, whereby said emulsion polymer contains reactive carboxyl and hydroxyl groups for crosslinking by reaction with said glycoluril.

10. The process in claim 9 wherein at least 1.5% by weight N-alkanol amide monomer is copolymerized to form said emulsion polymer.

11. The process in claim 8 wherein at least 1.5% by weight N-alkanol amide monomer is copolymerized to form said emulsion polymer.

* * * * *